(12) United States Patent
Yedvab

(10) Patent No.: US 11,736,791 B2
(45) Date of Patent: Aug. 22, 2023

(54) CAMERA SYSTEM AND METHOD FOR EFFICIENT CAPTURE AND DISTRIBUTION OF IMAGES

(71) Applicant: CLIQA SOCIAL LTD., Modiin (IL)

(72) Inventor: Hagit Hava Yedvab, Modiin (IL)

( * ) Notice: Subject to any disclaimer, the term of this patent is extended or adjusted under 35 U.S.C. 154(b) by 0 days.

(21) Appl. No.: 17/284,791

(22) PCT Filed: Oct. 23, 2019

(86) PCT No.: PCT/IL2019/051144
§ 371 (c)(1),
(2) Date: Apr. 13, 2021

(87) PCT Pub. No.: WO2020/084614
PCT Pub. Date: Apr. 30, 2020

(65) Prior Publication Data
US 2021/0392272 A1    Dec. 16, 2021

Related U.S. Application Data

(60) Provisional application No. 62/749,685, filed on Oct. 24, 2018.

(51) Int. Cl.
*H04N 23/63* (2023.01)
*H04N 1/00* (2006.01)
(Continued)

(52) U.S. Cl.
CPC ....... *H04N 23/631* (2023.01); *H04N 1/00251* (2013.01); *H04N 23/62* (2023.01); *H04N 23/80* (2023.01); *H04N 2201/0084* (2013.01)

(58) Field of Classification Search
CPC ......... H04N 5/232933; H04N 5/23216; H04N 5/232; H04N 5/23229; H04N 1/00;
(Continued)

(56) References Cited

U.S. PATENT DOCUMENTS

2004/0208476 A1* 10/2004 Manowitz .............. H04N 5/765
348/E7.071
2008/0106621 A1   5/2008 Jung et al.
(Continued)

FOREIGN PATENT DOCUMENTS

WO      2016061634 A1    4/2016

*Primary Examiner* — Kelly L Jerabek

(57) ABSTRACT

Some embodiments of the current invention relate to a methods and/or systems of automated capture, processing and/or dissemination of images. Optionally, a quick access (e.g. single gesture selection) is provided on a device user interface to capture, process and/or disseminate an image according to one of a plurality of protocols. As a picture is captured it is optionally processed and/or disseminated. Optionally this reduces the need for later intervention to classify, process and/or disseminate images. Optionally, the capture protocol may include maintenance actions, for example preserving a desired status of a collection of photos automatically when a captured photo is added to the collection and/or removing images under some conditions. In some embodiments, the device also includes an interface for defining configurations and/or disseminating defined configurations of image capturing and/or image sharing protocols.

26 Claims, 10 Drawing Sheets

(51) Int. Cl.
*H04N 23/62* (2023.01)
*H04N 23/80* (2023.01)

(58) Field of Classification Search
CPC ....... H04N 1/00251; H04N 2201/0084; H04N 23/631; H04N 23/62; H04N 23/80; H04N 23/64; H04N 23/661; G06F 3/0484; G06F 3/0482; G06F 3/04842; G06F 3/0488; G06F 1/1686; G06F 1/1626
See application file for complete search history.

(56) References Cited

U.S. PATENT DOCUMENTS

| | | | |
|---|---|---|---|
| 2013/0013699 A1 | 1/2013 | Huxley | |
| 2013/0332856 A1* | 12/2013 | Sanders | G06F 3/0488 |
| | | | 715/753 |
| 2014/0071323 A1* | 3/2014 | Yi | H04N 5/23216 |
| | | | 348/333.01 |
| 2017/0310888 A1* | 10/2017 | Wright | H04N 5/232935 |
| 2018/0205876 A1* | 7/2018 | Paulus | H04N 9/8205 |

\* cited by examiner

CAMERA SYSTEM AND METHOD FOR EFFICIENT CAPTURE AND DISTRIBUTION OF IMAGES

RELATED APPLICATION/S

This application claims the benefit of priority under 35 USC § 119(e) of U.S. Provisional Patent Application No. 62/749,685 filed 24 Oct. 2018, the contents of which are incorporated herein by reference in their entirety.

FIELD AND BACKGROUND OF THE INVENTION

The present invention, in some embodiments thereof, relates to photo taking and, more particularly, but not exclusively, to configuring a network enabled mobile communication device to facilitate convenient configuring and sharing of photos.

U.S. Pat. No. 9,679,072 appears to disclose, "Automated transmission of photos and contact information between people, with minimal manual steps. A company can use it to build a database of potential customers interested in their products. Another method lets Jane transmit her email address to Bob, who takes a photo of her and emails it to her."

U.S. Pat. No. 8,655,028 appears to disclose that, "A photo sharing system with a face recognition function is provided. The photo sharing system includes a photo browser and a photo sharing platform. The photo browser has a photo classification module for classifying plural photos according to face image contained in the plural photos, thereby generating a photo classification message. The photo classification message contains the photos having the face image of the same person. Moreover, the photo classification message may be transmitted to the photo sharing platform at the same time to be shared to the receiver corresponding to face image. By the photo sharing system, the efficacy of sharing photos will be enhanced."

U.S. Pat. No. 8,560,625 appears to disclose, "facilitating photo sharing among users of a social network system. In one embodiment, a method includes recognizing one or more people in a photo captured by a user. The method also includes sending a copy of the photo to at least one person recognized in the photo. The method also includes receiving, from the at least one person recognized in the photo, an indication of whether the at least one person approves the photo."

SUMMARY OF THE INVENTION

According to an aspect of some embodiments of the invention, there is provided a method of capturing images including: supplying on a first image capture device a user interface with a plurality of visual representations, each visual representation associated with a preset set of attributes for image capture and sharing; selecting by a user of one of the visual representations; capturing an image by the user with a respective set of the attributes associated with the one visual representation; and automatically processing the image according to the respective set of the attributes of the one of the visual representations.

According to some embodiments of the invention, the method further includes: modifying by the user of the attributes associated with at least one of the visual representations.

According to some embodiments of the invention, the method further includes: sharing by the user of the respective set of the attributes with another user; supplying on a second image capture device a user interface with a selectable representation associated with the one of the sets of the attributes; selecting of the selectable representation on the second image capturing device by another user; capturing an image by the another user the respective set of the attributes; and automatically processing the image according to the respective set of the attributes of the selected one visual representation.

According to some embodiments of the invention, the method further includes sharing captured images with a preset sharing group.

According to some embodiments of the invention, the method further includes processing an existing image according to the attributes including; associating the existing image with the one visual representation associated with a preset sharing group; and automatically processing the image according to the respective set of the attributes of the one of the visual representations.

According to some embodiments of the invention, the method further includes: detecting at least one attribute selected from a content and a context of the image and suggesting to the user the visual representation based on the detecting.

According to some embodiments of the invention, the method further includes: creating a new visual representation; and associating a new set of attributes with the new visual representation.

According to some embodiments of the invention, the method further includes: Selecting a second representation of the plurality of visual representations and processing and storing a second copy of the image in accordance with a second protocol associated with the second representation.

According to some embodiments of the invention, the image capturing and processing protocol adding promotional content to an image.

According to some embodiments of the invention, the image capturing and processing protocol adding promotional content to an album.

According to some embodiments of the invention, the automatic processing includes saving the image to a memory destination, the method further including: switching between a camera view configured for the capturing of the image and an album view of the memory destination in response to a gesture by the user on the user interface.

According to an aspect of some embodiments of the invention, there is provided a method of creating an image album for an event including: distributing a quick access interface and an associated image capture and processing protocol to a plurality of attendees of the event; displaying the quick access interface on a user interface of a personal image capturing device of each of the plurality of attendees activating the protocol by a gesture on the user interface by each of the plurality of attendees; employing the protocol to capture an image and sent it to the image album by each of the plurality of attendees storing a respective image from each of the users with the protocol on a shared storage location.

According to some embodiments of the invention, the sharing is via supplying a link to the each of the plurality of attendees.

According to some embodiments of the invention, the supplying includes displaying a computer readable link at the event.

According to some embodiments of the invention, the supplying includes broadcasting a link over a local network at the event.

According to some embodiments of the invention, the image capturing and processing protocol adding promotional content to an image.

According to some embodiments of the invention, the method further includes offering promotional content to users sharing images over the shared storage location.

According to some embodiments of the invention, the method further includes: Selecting a second the visual representation and processing and storing a second copy of the image in accordance with a second protocol associated with the selected second visual representation.

According to an aspect of some embodiments of the invention, there is provided a system for taking photos including: an image capturing device; a processor receiving an image from the image capturing device; a memory controlled by the processor storing a plurality of sets of preset attributes and associated visual representations; a user interface for controlling the processor by selecting one or more of the visual representations to apply the set of attributes to associate with the image captured by the image capturing device.

According to some embodiments of the invention, the system further includes: at least two memory destinations, wherein each set of attributes defines which of the at least two memory destinations to store the image.

According to some embodiments of the invention, at least one of the at least two memories is a shared memory.

According to some embodiments of the invention, the set of attributes further include instruction defining how to share the image.

According to some embodiments of the invention, the instruction include a network protocol for sending data over the network and wherein the at least one memory is accessible over the network.

According to some embodiments of the invention, the system further includes: a data communication interface to a network and a network protocol for sending data over the network to another image capture device and wherein the processor is further configured for sending the set of attributes to the another image capturing device over the network.

According to some embodiments of the invention, the network includes a social network and wherein the processor is configured for sharing the set of attributes over the social network.

According to some embodiments of the invention, the system further includes a memory destination, wherein each set of attributes includes instructions to store the image in the memory destination and wherein the processor is further configured to switch between a camera view of the image capturing device and an album view of the memory destination in response to a gesture on the user interface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
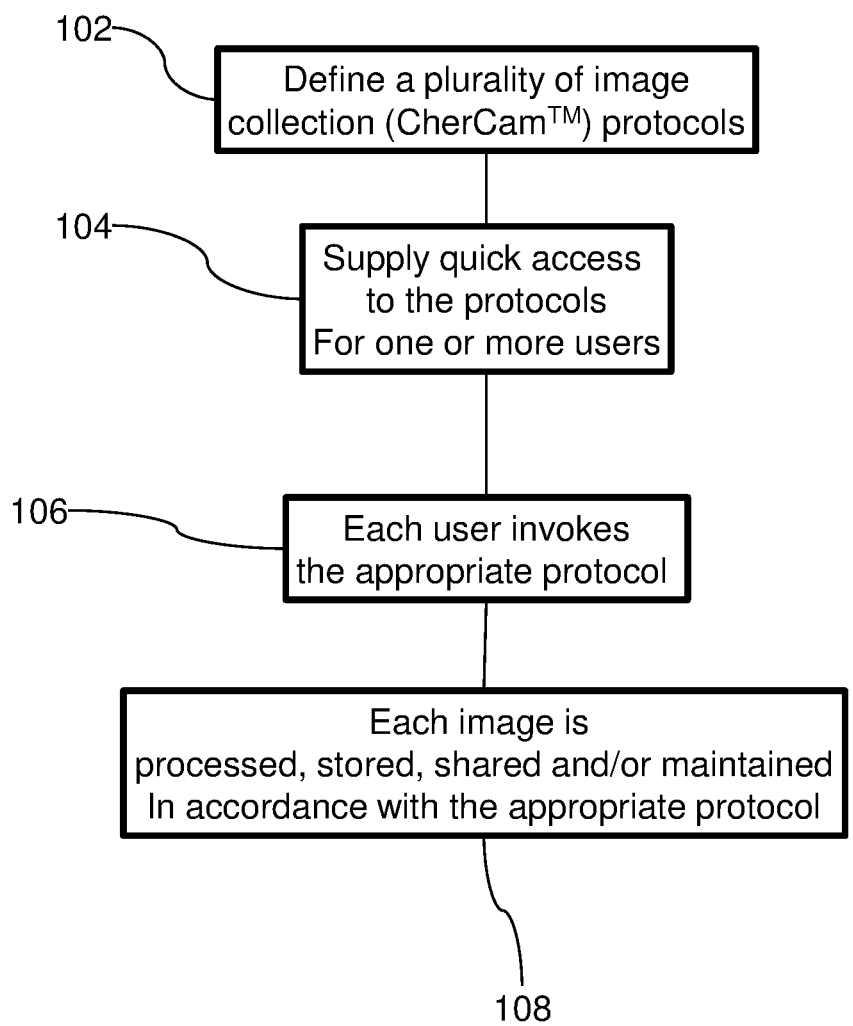
FIG. 1 is a flow chart illustration of a method creating a shared album in accordance with an embodiment of the current invention.

The present invention, in some embodiments thereof, relates to photo taking and, more particularly, but not exclusively, to configuring a network enabled mobile communication device to facilitate convenient configuring and sharing of images.

An aspect of some embodiments of the current invention relates to an image capture, data processing and data communication device including a plurality of predetermined configurations, each configuration defining an automated capture, processing and/or dissemination protocol for a captured image. An interface is optionally provided facilitating quick selection of a configuration (for example via a single gesture) and/or repeated capture, processing and/or dissemination of images according to the selected configuration. Optionally the combination of the protocol and the quick access interface may be referred to as a CherCam™. In some embodiments, the device also includes an interface for defining configurations and/or disseminating defined configurations of image capturing and/or image sharing protocols.

An aspect of some embodiments of the current invention relates to a method of automated capture, processing and/or dissemination of images. Optionally, a single action (e.g. single gesture) selection is made either to capture, process and/or disseminate an image according to a current protocol and/or to switch to a different protocol. As a picture is captured it is optionally processed and/or disseminated. Optionally this reduces the need for later intervention to classify, process and/or disseminate images. Optionally, the capture protocol may include maintenance actions, for example preserving a desired status of a collection of photos automatically when a captured photo is added to the collection and/or removing images under some conditions.

Conventionally, a camera may be controlled by a single photographer to collect photos which are later sorted and/or disseminated. Modern digital cameras enabled the photographer to capture vastly more images than in the past. It may be exceeding difficult and/or time consuming to sort the large number of images produced and/or disseminate (e.g. classify, view, store and/or share) the photos in an organized manner. Thus, there is a need for a more efficient way to classify, process and share images.

Modern digital cameras may include network communication capabilities. This has led to instant photo sharing and/or the possibility of sending images from multiple devices and/or locations to many recipients and/or a shared storage. This has also led to the possibility of sharing large numbers of images in real time among a large number of users. Sharing and/or particularly instant sharing may quickly lead to vast sets of images and/or information overload. These large sets of images may include images of vastly different significance and/or include large numbers of images that are redundant and/or appear redundant. Dealing with such a large collection of unsorted data may lead to information overload for example resulting in an inability to access valuable information and/or waste of valuable resources sorting data of dubious value.

Modern digital cameras may include sophisticated data processing capabilities. This has led to rapid development of automatic photo processing tools (often including artificial intelligence). Automatic, artificial-intelligence based tools, may save a lot of time categorizing data, but they sometime miss the point. For example, valuable and/or irreplaceable images may be overlooked due to the lack of the 'human-intelligence' factor (e.g. contextual knowledge) relating to particular image and/or set of images.

In some embodiments, the current invention employs a new paradigm to alleviate problems of organization and dissemination of a images. According to some embodiments image sorting, sharing and/or processing may begin before the images are made. Thus, in some embodiments, the invention facilitates users supplying input and/or control of the sorting and/or dissemination of images before the images collect up and/or become unmanageable.

In order to gain both the advantage of the automatic click-reduced method, and still regain 'intelligent' results which comply with our true needs, we will define the following abstraction:

Instead of dealing only with the photos and albums which we wish to manipulate, the current invention in some embodiments thereof will deal with the means for creating and/or sorting the photos. For example, to facilitate control at such a high level of abstraction the current disclosure supplies tools for defining entities of instances and/or picture manipulating instances.

The term CherCam™ is used herein in a general sense to describe a protocol in accordance with the current invention. In some embodiments, a CherCam™ refers to an instance of a protocol for capturing and/or processing an image and/or a quick action interface available to a user of the device to activate the protocol.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flow chart illustration of a method creating a shared album in accordance with an embodiment of the current invention. In some embodiments, a plurality of image collection and/or processing protocols are defined 102. In some embodiments, an interface is supplied allowing a user to create and/or modify a protocol. Optionally, a quick access interface is supplied 104 for each protocol. For example, each protocol may be associated with an icon.

Optionally, the protocol interface appears on a user interface of the user. For example, an icon may appear on a page of a user interface of a device. Additionally or alternatively, a protocol and/or interface for the protocol may be sent to a user and/or be shared between users, for example using a network and/or a social network. In some embodiments, the protocol may be invoked 106 by a user to capture and/or process an image by a single gesture (for example selecting the icon to capture an image and/or dragging dropping an existing image to the icon and/or dragging and dropping an existing camera protocol to the icon to capture an image with the camera protocol and processes 108 it with the processing protocol). For example, the processing 108 may include saving an image to a storage location in which resides the album. For example, a plurality of users may create a shared album each user sending images to the album using his copy and/or version of a protocol that saves images to the album. Optionally, the icon and/or protocol may be employed by a user to access the album (for example to open a gallery to see the contents of the album). For example, a gesture (for example a long click on the protocol icon and/or dragging a gallery icon to the protocol icon) may open up a gallery of the album referenced by the protocol.

Figure 2:
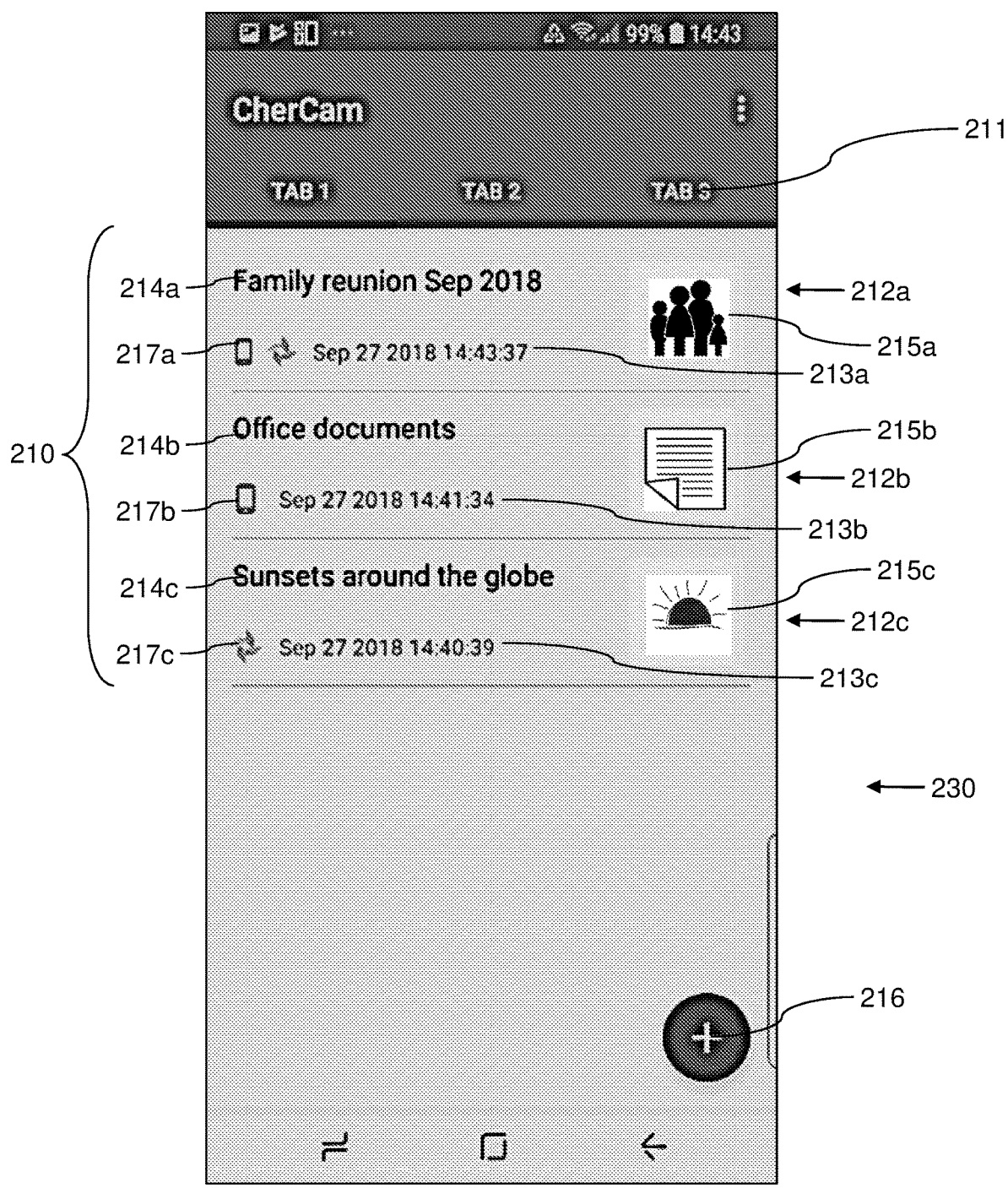
FIG. 2 is a screen shot image of definition page for instances of shared image collection protocols (CherCams™) on a network communication camera in accordance with an embodiment of the current invention.

FIG. 2 is a screen shot image of definition page 230 for instances of shared image collection protocols (Cher-Cams™) on a network communication camera 200 (which may include for example a cellular communication device for example a smart phone) in accordance with an embodiment of the current invention. For example, a definition page may include a list 210 of existing CherCams™ 212*a*, 212*b* and 212*c*, Optionally, the list may contain further sections and/or further CherCams™. For example, further portions of the list may be available through access tabs 211. The list 210 optionally includes information about each CherCam™ 212*a*-212*c* for example a respective name 214*a*, 214*b*, 214*c*, a respective time and/or date 213*a*, 213*b*, 213*c* when an image was last added using the protocol and/or a respective icon 215*a*, 215*b* and/or 215*c*. Additionally or alternatively, there may be an interface activation icon 216 for adding a new CherCam™.

In some embodiments, a user may select interface activation icon 216 for adding a new CherCam™. The adding a CherCam™ interface may query the user for a name of the CherCam™. For example, a CherCam™ may be named according to a group with whom the images may be shared (for example read and/or write access to the collection may be supplied to family and/or friends from school and/or Chemistry 101 and/or unshared). For example, naming a CherCam™ according to sharers may make it convenient to share images. Alternatively or additionally, a CherCam™ 212*a* may be named 214*a* for an event. Alternatively or additionally, a CherCam™ 212*b*, 212*c* may be named 214*b*, 214*c* for a content of the images. Alternatively or additionally, a CherCam™ may have a name for how long to store (for example 2 days, 2 weeks, keep). Optionally, images made by each of the protocols may be deleted and/or archived after the specified time. For example, naming a CherCam™ for a storage time may assist a user in keeping control of storage space on a mobile device and/or of access to materials that s/he wants available temporarily.

In some embodiments, a user will be asked to supply a site for storage of images. For example, images collected using a particular CherCam™ 212*a* may be targeted to one or more folders bearing the name 214*a* of the CherCam™ 212*a*. Optionally, the folder is automatically created and/or managed. The named target folders of a CherCam™ 212*a*-212*c* may reside anywhere (for example, on the local device 217*b* and/or on the cloud 217*c* and/or both device and cloud 217*a*). Additional options are possible some of which are listed for example herein below.

Figure 3:
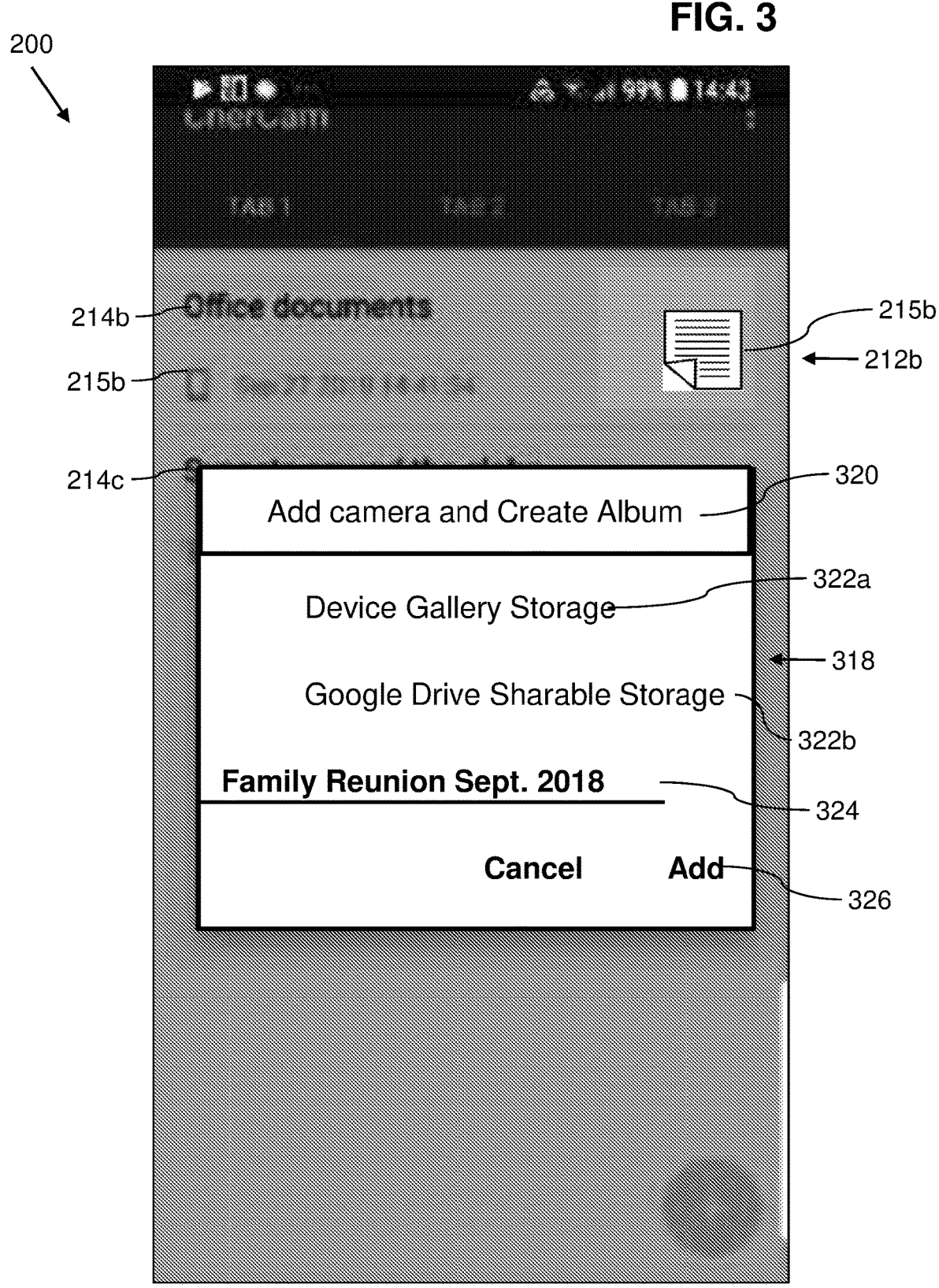
FIG. 3 is a screen shot illustration of naming a CherCam™ and/or folder for storage of images in an embodiment of the current invention.

FIG. 3 is a screen shot illustration of naming a Cher-Cam™ 212*a*-212*c* and/or folder for storage of images in an embodiment of the current invention. For example, an add protocol window 318 may include a title 320 and/or choices for storage location 322*a* 322*b* and/or a name query box 324 and/or action buttons 326.

Figure 4:
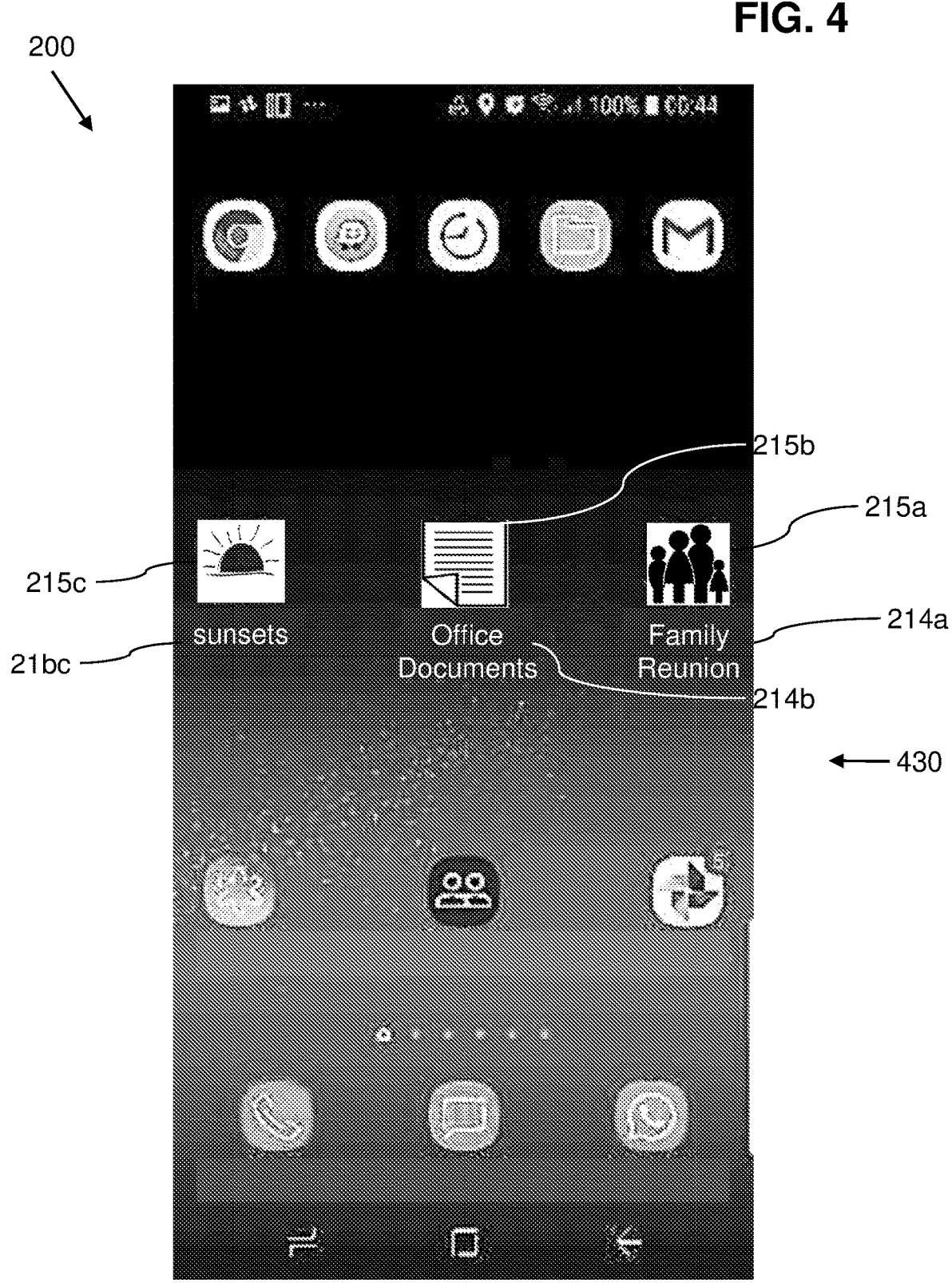
FIG. 4 illustrates a native menu of camera with network communication in accordance with an embodiment of the current invention.

FIG. 4 illustrates a native menu 340 of camera 200 with network communication in accordance with an embodiment of the current invention. In some embodiments, a Cher-Cam™ 212*a*-212*c* facilitates automatic photo sorting according to personalized settings in one gesture. For example, icons 215*a*-215*c* and/or names 215*a*-215*c* may be configured for viewing and/or manipulation on a native user interface of a user's device. For example, icons 215*a*-215*c* and/or names 215*a*-215*c* may be placed on a menu of the device (for example a device home screen 230). Optionally icons 215*a*-215*c* are associated with CherCams™ 212*a*-212*c*. Optionally, selecting an icon 215*a*-215*c* on native menu 430 activates the associated CherCam™ 212*a*-212*c*. For example, tapping icon 215*a* opens a default device camera app (and/or a camera app selected when the Cher-Cam™ 212*a* was created) and/or captures a photo. Alternatively or additionally, the camera interface is opened and waits for a user to capture a photo. For example, the camera is opened with options preselected when CherCam™ 212*a* was created. Optionally, images are processed and/or saved to a storage location 217*a* as specified in the protocol of the CherCam™.

Figure 5:
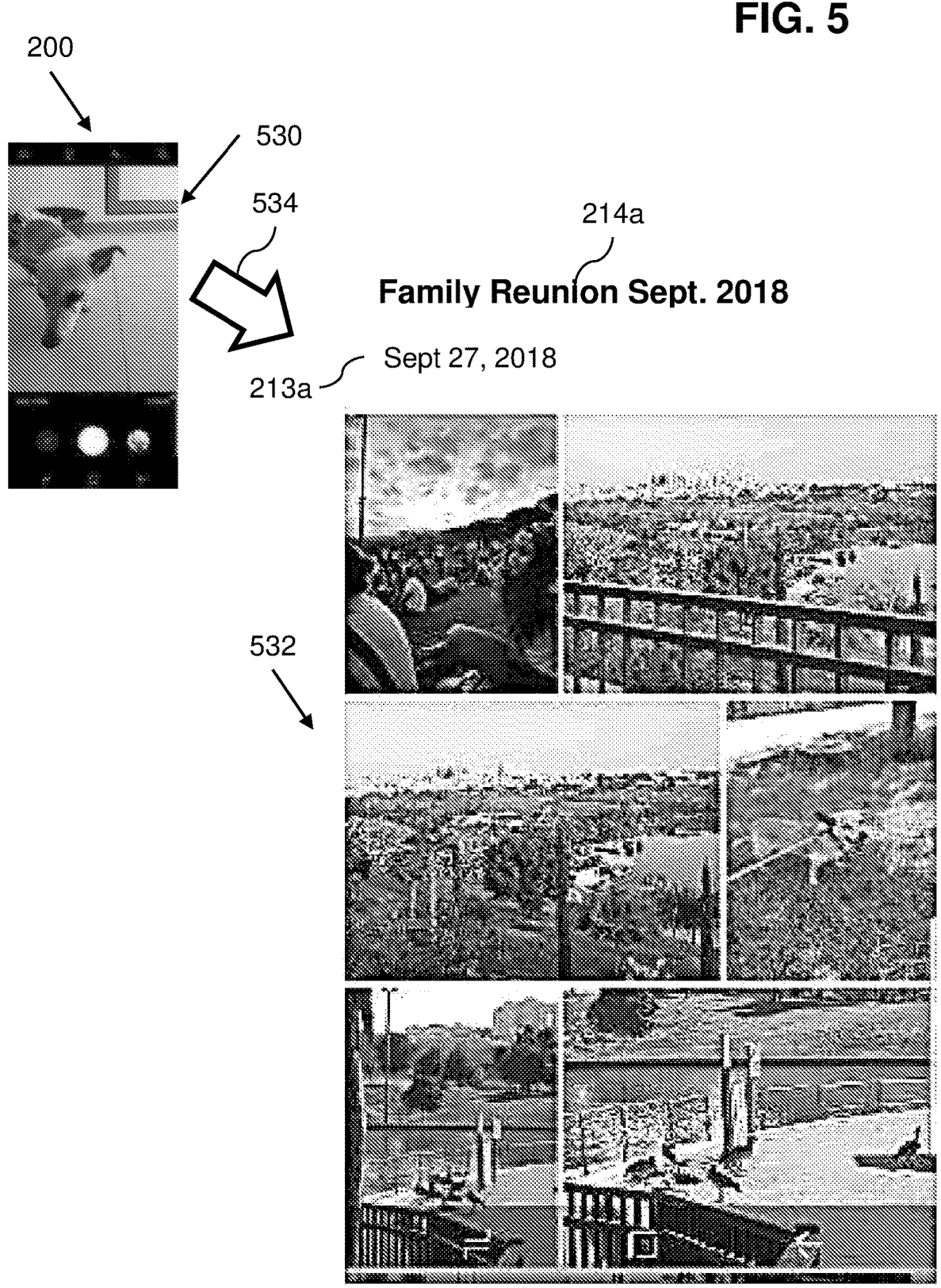
FIG. 5 illustrates a camera page of a device sending an image to a shared album in accordance with an embodiment of the current invention.

FIG. 5 illustrates a camera page 530 of device 200 sending an image to a shared album 532 in accordance with an embodiment of the current invention. An image may be shared automatically and/or individually. For example, when an image is targeted to a cloud storage it may be shared with a contact. In some embodiments, the CherCam™ interface includes a way to switch between the camera page 530 and the shared album 532 view. Optionally, there may be a convenient gesture and/or an intuitive transition to trigger and/or indicate the switch. For example, a sideways swipe across the camera page 530 may cause a revolving door transition to the album 532 view.

Figure 6:
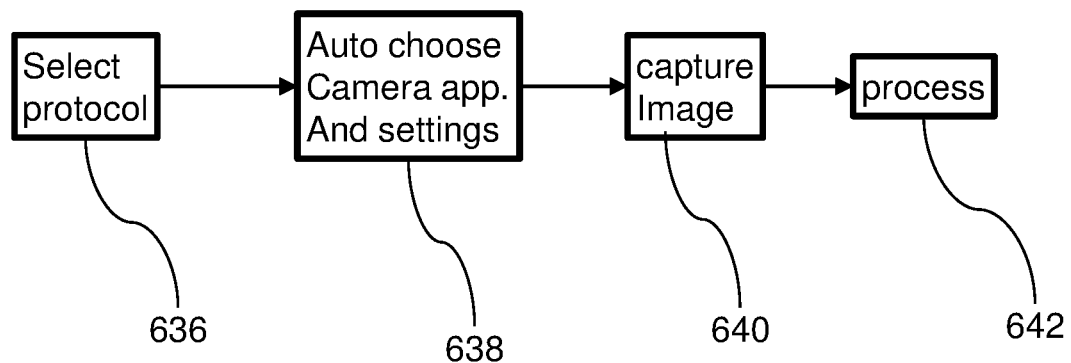
FIG. 6 is a flow chart illustrating automatic capture and/or processing of an image in accordance with an embodiment of the current invention.

FIG. 6 is a flow chart illustrating automatic capture and/or processing of an image in accordance with an embodiment of the current invention. In some embodiments, a user who wants to process and/or or share a photo according to predefined protocol selects 636 a CherCam™ associated with the protocol. For example, the CherCam™ may be selected with a single action, for example selecting an icon on a home screen and/or on a recent items list. Optionally, the icon chooses 638 a camera application and configures it according to a predefined configuration. In some embodiments, the protocol may immediately capture 640 a photo and/or process it (for example, a Chercam™ icon can be placed on an arbitrary menu on a device, this may facilitate immediate taking and processing of a photo in many contexts). Alternatively or additionally, the protocol opens the camera application with the preset configuration and/or allows the user to capture 640 one or more images as he desires. Optionally, the images are processed 642 according to the protocol. For example, processing 642 may include compressing and/or enhancing and/or adding a mark (for example a commercial logo) to the image. Optionally processing 642 includes storing the image in one or more predetermined storage locations and/or sharing the image with one or more other users.

Figure 7:
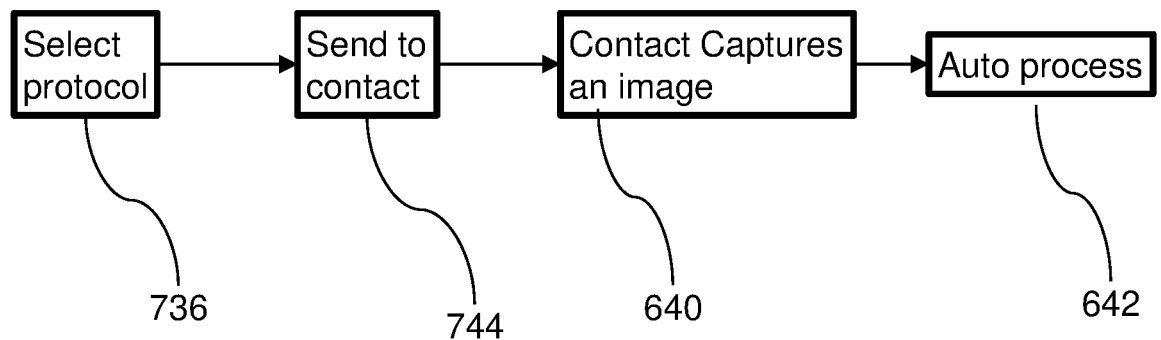
FIG. 7 is a flow chart illustration of sharing a CherCam™ in accordance with an embodiment of the current invention.

FIG. 7 is a flow chart illustration of sharing a CherCam™ in accordance with an embodiment of the current invention. In some embodiments, a protocol associated with a CherCam™ may be shared with another user. For example, when a CherCam™ 212a is targeted to a cloud storage location, a user may select 736 the CherCam™ (for example selecting an icon on a menu and/or desktop and/or right clicking the icon) and then share 744 it with a contact. Optionally, the icon 215a and/or name 214a of the CherCam™ will appear on the contact's protocol list (e.g. similar to list 210). The contact may capture 640 a picture using the shared Cher-Cam™ 212a (for example by tapping a Camera-Icon 215a on his device). Optionally, the picture will now automatically be processed 642 in accordance with the associated protocol. For example, the picture will be adjusted and/or stored in accordance with the associated protocol. For example, the picture will reside in a shared cloud album 532 of all sharers. Optionally, each user may share with numerous contacts. Alternatively or additionally, there may limits to sharing the CherCam™ 212a and/or access to the album 532. For example, an administrator may define sharing attributes (e.g. sharers may capture images or just view, sharers may share with others, sharers may have owner rights, some sharers may be able to change attributes of the CherCam™ on their own machine and/or at a shared storage location, some users may be given only partial access to the CherCam™ (e.g. without permission to make changes in an associated protocol and/or without permission to see the source code etc.)).

In some embodiments, based on various parameters either added by the user and/or recognized by the device (for example using machine learning) the device may send a suggestion and/or send a warning message to the user and/or to an administrator (e.g. over the network). For example, depending on various factors such as the sharers—the time—the place—the type of photograph (a document and/or a snapshot and/or a quantity of skin visible) that this photo may not be appropriate for these sharers and/or sharing this may violate privacy, privileged information, copyrights. For example, depending on the time and/or subject the device may suggest adding a protocol and/or sharing rule. For example, when using a "baby picture" CherCam™ and/or a "family outing" CherCam™, the device may suggest "your brother hasn't seen a picture of the baby for a while, maybe you want share the picture with him. For example, the device may suggest taking the picture with a "family" CherCam™ that stores pictures on a family album accessible to the brother.

In some embodiments, a user may specify multiple Cher-Cams™ for a single image. For example, a CherCam™ screen may have an "add" action button and/or "subtract" action button. For example, when a new CherCam™ is added then the photo may be shared both with people specified by the original CherCam™ and with people specified in the added CherCam™. In some embodiments, the image may be processed differently by different protocols and/or stored in different forms in different storage locations.

Figure 15:
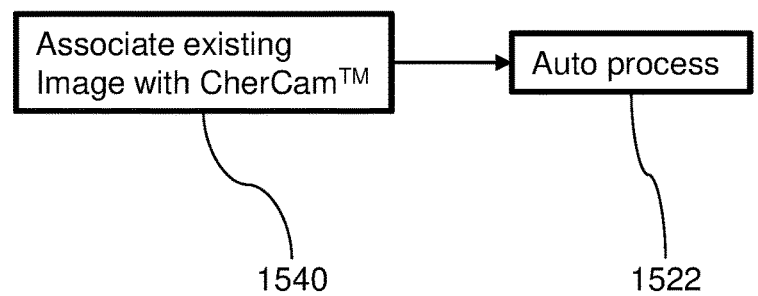
FIG. 15 is a flow chart illustration of a method of processing an existing image in accordance with an embodiment of the current invention.

In some embodiments, a protocol and/or an associated application may send automatic warning messages. For example, a warning message may be issued when a sensor senses that the user is in a sensitive area (a bathroom, a military base, a lawyer's office, a doctor's office) and s/he is using a CherCam™ that sends a picture to a large viewing population. In some embodiments, a CherCam™ icon may appear as a target in a sharing menu, for example a "ShareAction Provider" of a photo gallery. For example, the particular CherCam™ icon may appear in a sharing menu of an application and/or a list of sharing options. For example, based on context or content, a CherCam™ icon may be temporarily added to a certain menu as determined by an algorithm. Optionally, choosing the icon would result in a current image being shared with those people to whom images captured with the CherCam™ are shared. Alternatively or additionally, a general icon may appear and when the general pre-configured image capture and distribution icon is selected the user will be able to choose from a selection of CherCams™. Alternatively or additionally, for example as illustrated in FIG. 15, a CherCam™ may supply a convenient way to process an existing image in accordance with an existing protocol. Optionally, the user links 1540 existing image is with the protocol. For example, a user may drag and drop the image to an icon associated with the protocol. Optionally this will cause the processor to process 1522 the existing image in accordance with the protocol. For example, the processor may classify and/or share and/or store and/or modify (for example adding marks, changing attributes, compressing etc.) the existing imaging according to the attributes of the particular CherCam™. In some embodiments, the CherCam™ may process existing images differently from a captured image. For example, a captured image may be captured with a preset set of camera attributes and shared with a predetermined group, whereas the existing image may be shared with the predetermined group but the attributes of the existing image may remain unchanged.

Figure 8:
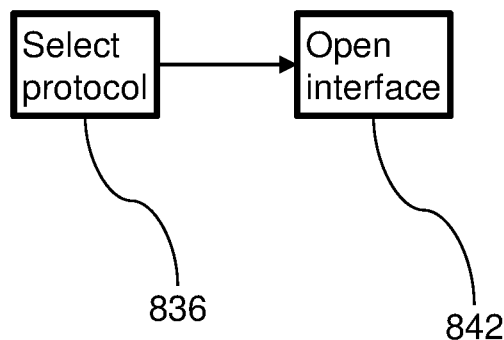
FIG. 8 is a flow chart illustration of viewing images using a CherCam™ in accordance with an embodiment of the current invention.

FIG. 8 is a flow chart illustration of viewing images using a CherCam™ in accordance with an embodiment of the current invention. In some embodiments the CherCam™ name on a list and/or the CherCam™ icon may be used to open up an application to view and/or edit images. Optionally, an icon and/or name of a CherCam™ may be selected 836. For example, selecting 836 may include right clicking and/or long clicking the icon, which may open 842 the directory and/or a menu with an option to view images and/or an image viewing application in a directory targeted by the CherCam™. For example, a directory where the CherCam™ saves images and/or files owned by a group associated with the CherCam™ and/or set of groups associated with the CherCam™ may be opened 842.

In some embodiments, the use of a CherCam™ may make photography easier and/or reduce the number of user actions to make a photograph, sharing and/or sorting images. For example, using embodiments of the current invention a user may take a photo and save it to a shared album in two user steps (for example as illustrated in FIG. 6): 1) select a CherCam™ 636 (e.g. click on a name or icon associated with a CherCam™) 2) capture 640 the photo (e.g. point and click the photo-trigger to capture a photo). The rest is optionally done automatically by the protocol associated with the CherCam™. For example, one may compare this to taking a picture and adding the image to a shared album in Google™ Photos in eight steps 1) Click on your chosen camera app 2) Click to capture a photo 3) Click to open Google photos application 4) Click on 'Albums' 5) Click to choose the specific shared album 6) Click on 'Add Photo' Icon 7) Click to choose photo from gallery 8) Click 'Add'.

Figure 9:
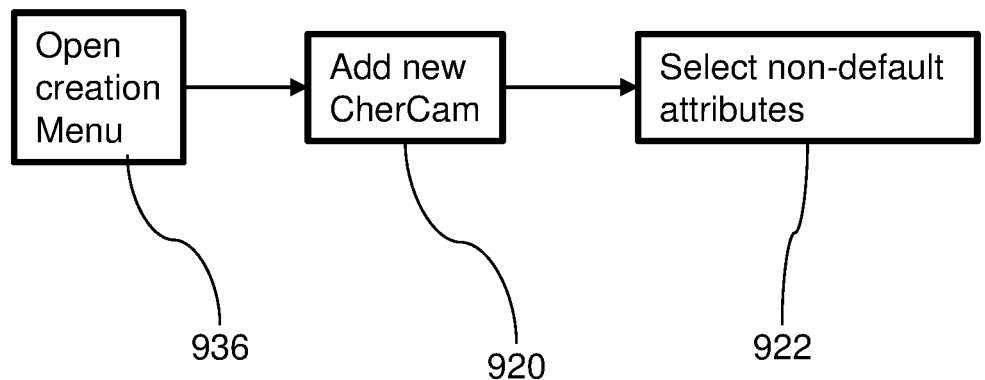
FIG. 9 illustrates setting up a new CherCam™ and/or image handling protocol in accordance with an embodiment of the current invention.

FIG. 9 illustrates setting up a new CherCam™ and/or image handling protocol in accordance with an embodiment of the current invention. Optionally a user opens 936 a CherCam™ creation menu and/or application. The user optionally chooses a create new menu item. For instance, this opens a configure menu with default attributes. The user may now select 922 those attributes (e.g. name of album, icon, skin, how shared, where stored, camera characteristics (for example resolution, exposure, filters etc.)) that he wants to change to non-default values. The user may also choose an icon associated with the CherCam™ and/or decide where the icon should appear. For example, by the grouping together an instance, along with specific behavioral traits and/or a specific set of instructions. the user may greatly simplify and/or quickens processes for single user image acquisition and/or sharing images.

In some embodiments, a CherCam™ is targeted to a folder which may reside in various types of destinations. The CherCam™ target folder may optionally reside in a combination of numerous destinations. Following are some examples:
 Google Photos
 iCloud Photo Library
 a proprietary cloud storage
 local device storage
 Destination residing in a social network platform which exposes an API, such as for example:
  Facebook
  Instagram
  Snapchat In some embodiments, a CherCam™ protocol may open an existing picture taking protocol on a camera device. For example, the CherCam™ may open a default built-in device camera as defined by the device factory settings and/or the currently defined default device camera (Usually defined by user at some point in time) and/or any 3rd party camera application downloaded by the user from an application store and/or any camera API exposed by a 3rd party provider (e.g. social network service such as Instagram).

In some embodiments, a CherCam™ may define a specific set of the camera settings options, to be used by a particular CherCam™. For example, a set of options may include any sort of characteristics or attributes exposed by the API of the assigned camera application and/or camera device. Additionally or alternatively, a set of options may include attributes accessed by other types of products, such as additions to camera applications (e.g. filter applications).

Figure 10:
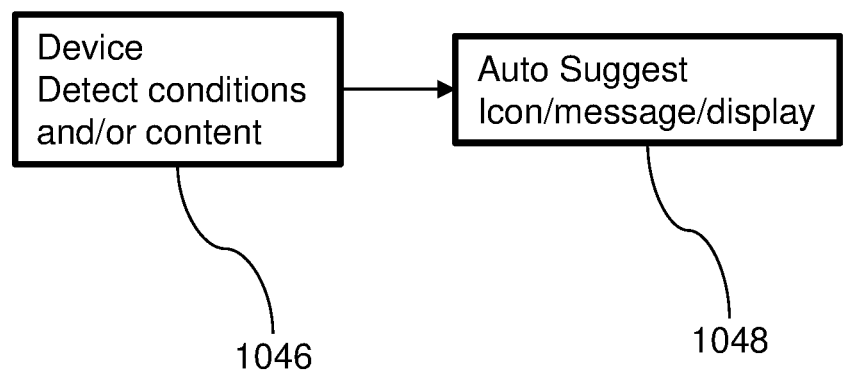
FIG. 10 is an illustration of suggesting an image capturing protocol in accordance with an embodiment of the current invention.

In some embodiments, a CherCam™ icon may appear in a menu and/or screen of a picture taking device. For example, a processor may be programmed to add a link to a CherCam™ in a particular menu location in response to various contextual reasons. For example, as illustrated in FIG. 10, a photo taking device may include a processor and/or sensors that detect 1046 conditions when a photo is captured and/or content of the photo. Optionally the device may suggest 1048 an appropriate CherCam™ for use. For example, the suggestion may be based on a content of a photo and/or on a condition such as the context of the photo. For example, when a photo is captured outdoors at Aspen Colo. on a winter day, the device may suggest 1048 using a "skiing" CherCam™ and/or a "vacations" CherCam™. For example, the suggestion of a CherCam™ may depend on a context of a photo (for example the physical location (for example based on a GPS sensor and/or based on a WIFI connection) and/or the time of day (e.g. based on a device clock and/or a time zone) and/or the fact that the camera is moving in a vehicle [e.g. based on a GPS sensor and/or an accelerometer data and/or the use of a navigation application]). For example, the device may recognize 1046 a content of a photo (for example that it contains a document at close range and/or a daylight scene and/or portrait and/or a picture of a recognizable person/object) and/or suggest 1048 a CherCam™ to apply protocol for processing the image. Alternatively or additionally, the computer learning may be used to suggest 1048 the proper CherCam™. For example, a suggested CherCam™ may temporarily be placed on a device desktop and/or a device menu for example in a share action bar.

In some embodiments, it is possible to store a photo using multiple CherCams™ and/or use multiple CherCams™ to access the same image. For example, when a CherCam™ is opening, a list of additional CherCams™ may appear that may be added. Multiple CherCam™ icons may be shown telling the user that he or she is sending to multiple CherCams™. Optionally multiple copies of the photo may be stored e.g. a copy for each instance. Alternatively or additionally, a single version may be stored and/or additional copies may be stored as needed when a change and/or a deletion is made in one of the instances. Optionally, the device will predict likely CherCams™ that the user may want to add or subtract and/or displays the icons and/or a symbol to add or subtract.

In some embodiments, a CherCam™ may be associated with a rule for storage (for example associated with a storage location and/or a file attribute and/or a function running on a processor). For example, photos saved by a particular CherCam™ may be deleted from the target folder whenever they reach a certain age or on certain days of the week. For example, photos saved by a particular CherCam™ may be compressed whenever they reach a certain age and/or on a certain day of the week.

In some embodiments, a CherCam™ may store files with a predetermined attribute. For example, the attribute may specify permissions (for example copy protection, limits to who can modify and/or deleted the file, for example deletion may require permission of multiple sharers and/or a CherCam™ initiator). Alternatively or additionally, a CherCam™ may be associated with a specific group of people. For example, the group may have permission to use or modify the file (for example the photos may be stored in a storage location where certain such people have read/modification/delete permission). Alternatively or additionally, when a photo is captured with a certain CherCam™ a notification may be sent to such group of people that the photo is available (the availability may be limited in time and/or usage rights etc.). In some cases, a CherCam™ may include a warning protocol. For example, images may be saved to a storage location and/or sharing platform that issues a warning message to a particular person and/or group before a file is permanently deleted and/or changed and/or moved (e.g. allowing sharers to retrieve and/or store the original before they lose access). Alternatively, the protocol associated with the CherCam™ may implement backup, protection and/or notification protocols of various kinds.

In some embodiments, a CherCam™ may specify camera attributes that will be used for pictures captured using the CherCam™. For example, attributes may include resolution, exposure, contrast, hue a filter etc. Optionally, a user may configure different CherCams™ for different kinds of photographs e.g. action, portrait, night, indoor, outdoor, etc.

In some embodiments, a CherCam™ may specify that photos will be stored in a compressed format. Additionally or alternatively, a photo may be stored in a full detail format for a limited time. Optionally, some or all sharers may be given a warning message before the photo is compressed so that they can retrieve and/or store the full version if they want.

In some embodiments, the a CherCam™ may trigger a protocol on a device that suggests improvements and/or suggest good shots.

In some embodiments, a CherCam™ may be associated with a camera type. For example, a camera type may be defined by the user for example by specifying some or all of:

a specific camera application or service (for example as described in embodiments above); a set of camera attributes for the chosen camera application (for example as described in embodiments above); a set of associated rules (for example as described in embodiments above)

In some embodiments, the current invention provides a way for a user to provide customized choices of camera types and/or an interface to provide easily accessed customized camera configurations to a multi-use device. For example, a user may define a Camera Type and assign it to be the default Camera Type to be activated by a specific CherCam™. In some embodiments, the current invention will facilitate sharing of camera types among users and/or transferring a set of preferred settings between devices. For example, a user may get used to a set of choices for camera settings and/or share them with multiple devices. Optionally, this will facilitate achieving a consistent image quality over different devices. Alternatively or additionally, the same icon and/or CherCam™ name may be used on different devices and/or the settings on each device may be customized to achieve the same quality results on different devices. For example, an icon and/or name may be associated with camera attributes that will enable improved photographic results, for specific use cases. Optionally a CherCam™ may be named according to its use cases. For example: Indoor camera, Outdoor camera, Day camera, Night camera, Sunset camera, Document camera, Slides camera, Birdwatching camera, Cat photography camera, Car racing camera, Runners camera, Portrait camera, Kid photography camera, View camera, Snow camera, Rain camera, Sea view camera etc. action/still/special effects. In some embodiments, different CherCams™ may be defined for large numbers of camera type variations. Defining and/or naming a CherCam™ for each variation may make easier to access and shared an appropriate set of camera attributes for different situations.

Figure 11:
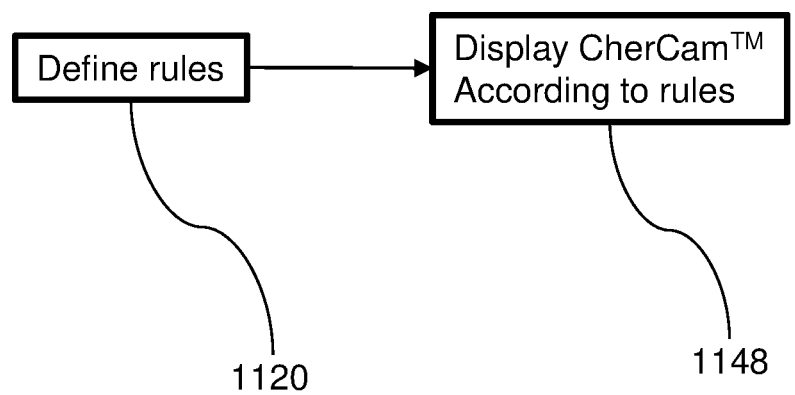
FIG. 11, illustrates a method for customizing rules for displaying of a CherCam™ and/or suggesting a CherCam™ in accordance to an embodiment of the current invention.

FIG. 11, illustrates a method for customizing rules for displaying of a CherCam™ and/or suggesting a CherCam™ in accordance to an embodiment of the current invention. In some embodiments of the current invention, a user will define 1120 rules and attributes that will define when the camera will appear for specific use cases. For example: an appropriate CherCam™ may automatically be displayed 1148 at an opportune moment. For example, a "family album" CherCam™ may be placed on a home menu of the device when the device is within 1 Km of the physical location of his home and/or a meeting CherCam™ may automatically appear on a meeting reminder that was made by a user's secretary and/or a "meeting with BOB" CherCam™ may appear when a meeting is held with a certain client and/or a "skiing shots" CherCam™ may be placed on a user's desktop whenever he or she is near a ski resort (for example as recognized on a navigation application) during skiing season.

Figure 12:
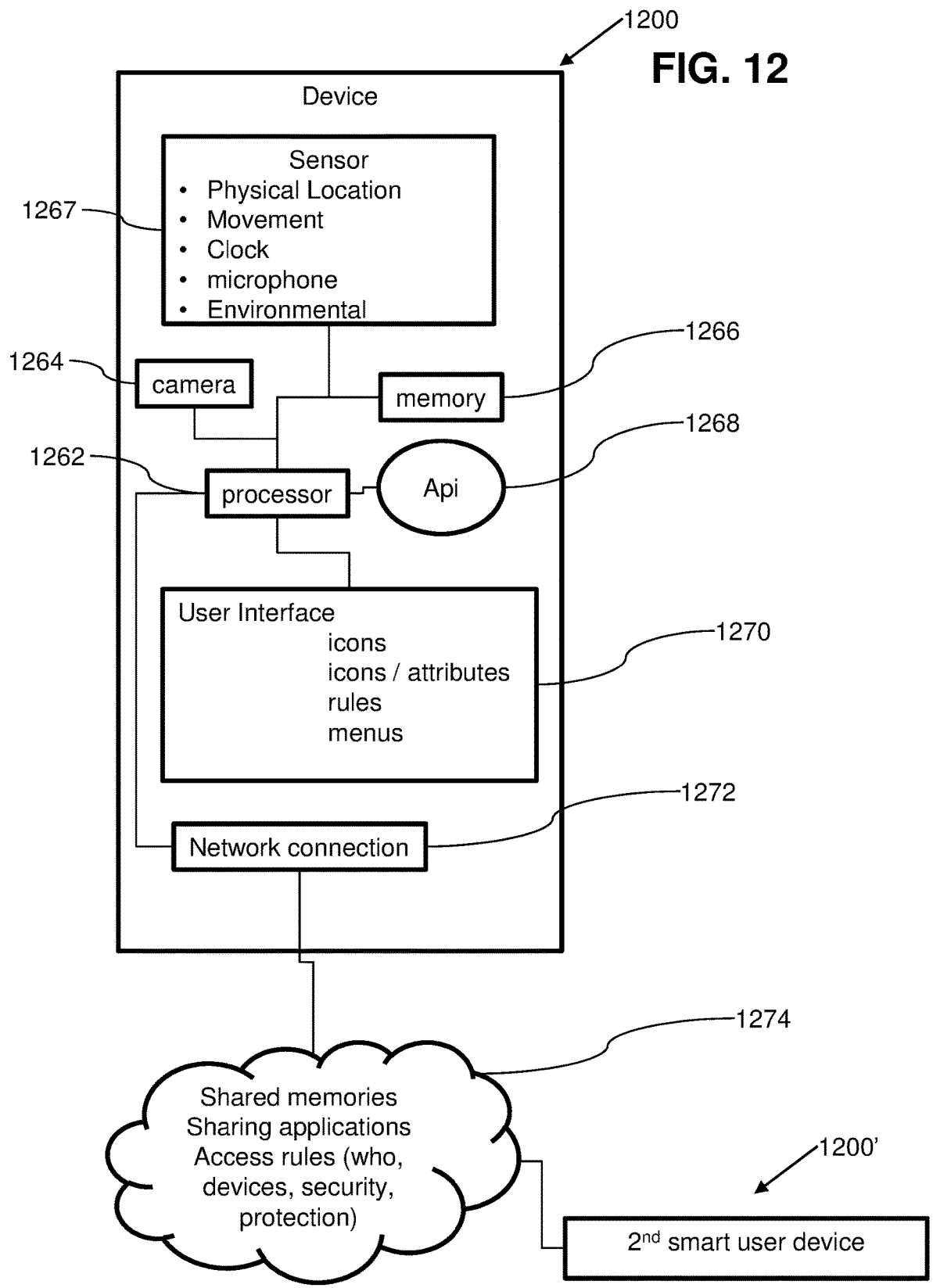
FIG. 12 is a block diagram illustration of an image capturing system in accordance with an embodiment of the current invention.

FIG. 12 is a block diagram illustration of an image capturing system in accordance with an embodiment of the current invention. In some embodiments, an image capturing device may include a processor 1262 connected to a camera 1264. Optionally the processor is also connected to one or more sensors 1267 and/or memory 1266.

In some embodiments, memory 1266 may include physical location information. For example, the memory 1266 may include information from navigation applications about a physical location associated with the user (e.g. home) associated with certain icons (e.g. "family" CherCam™) and/or a general physical location (e.g. Aspen Colo.) associated with a certain CherCam™ (e.g. "skiing" CherCam™) Optionally the memory 1266 may include software for example, an Artificial Intelligence (AI) routine. Optionally, the processor 1262 may run the AI to learn that this physical location is associated with a particular CherCam™. The device may recognize people and/or picture content associated with a certain CherCam™, The Processor 1262 may suggest a CherCam™ and/or put it in an easy to find menu location and/or warn a user when he or she is using an apparently inappropriate CherCam™. Other signs that help auto select a CherCam™ may include the time of day, the type of content (e.g. a document, a dog, a person, scenery).

Optionally processor 1262 is also connected to a user interface 1270. For example, user interface presents CherCam™ shortcuts for example icons. Optionally the icon can be used to capture and/or share images with predetermined attributes in a single action (e.g. a single click) and/or or a small number of actions (e.g. click, point, shoot). An interface may be presented over the user interface 1270. For example, the Interface may include menus for adjusting a protocol associated with a CherCam™ and/or creating a new CherCam™.

In some embodiments, device 1200 includes a communication module 1272. For example, module 1272 may include wireless data communication ability, for example hardware (transmitter, receiver, antenna) for various wired and/or wireless communication and/or network protocols (for example, GSM, UMTS, LTE, LTE Advanced Pro, 2G, 3G, 4G, 5G, Bluetooth, WIFI, UV and/or other technologies). Optionally, communication module 1272 is connected to processor 1262 and/or memory 1266 for example for transmitting digitized images, CherCam™ components (for example settings, protocols, passwords, sharing information). Optionally, data is shared over a network 1274. Optionally the system is connected over a network for data communication and/or participation in social networks, sending and receiving images, sending and receiving CherCam™ data, updating protocols, security etc. For example, the network 1274 may be used to communication (including some or all of the above data) with another image collecting device 1200'.

In some embodiments, device 1200 includes an application program interface API 1268. For example, the API 1268 may give the CherCam™ access to protocols of the camera 1264 and/or communication module 1272 and/or user interface 1270. Additionally or alternatively, an API may give other applications access to a CherCam™ and/or a CherCam™ creation interface.

Figure 13:
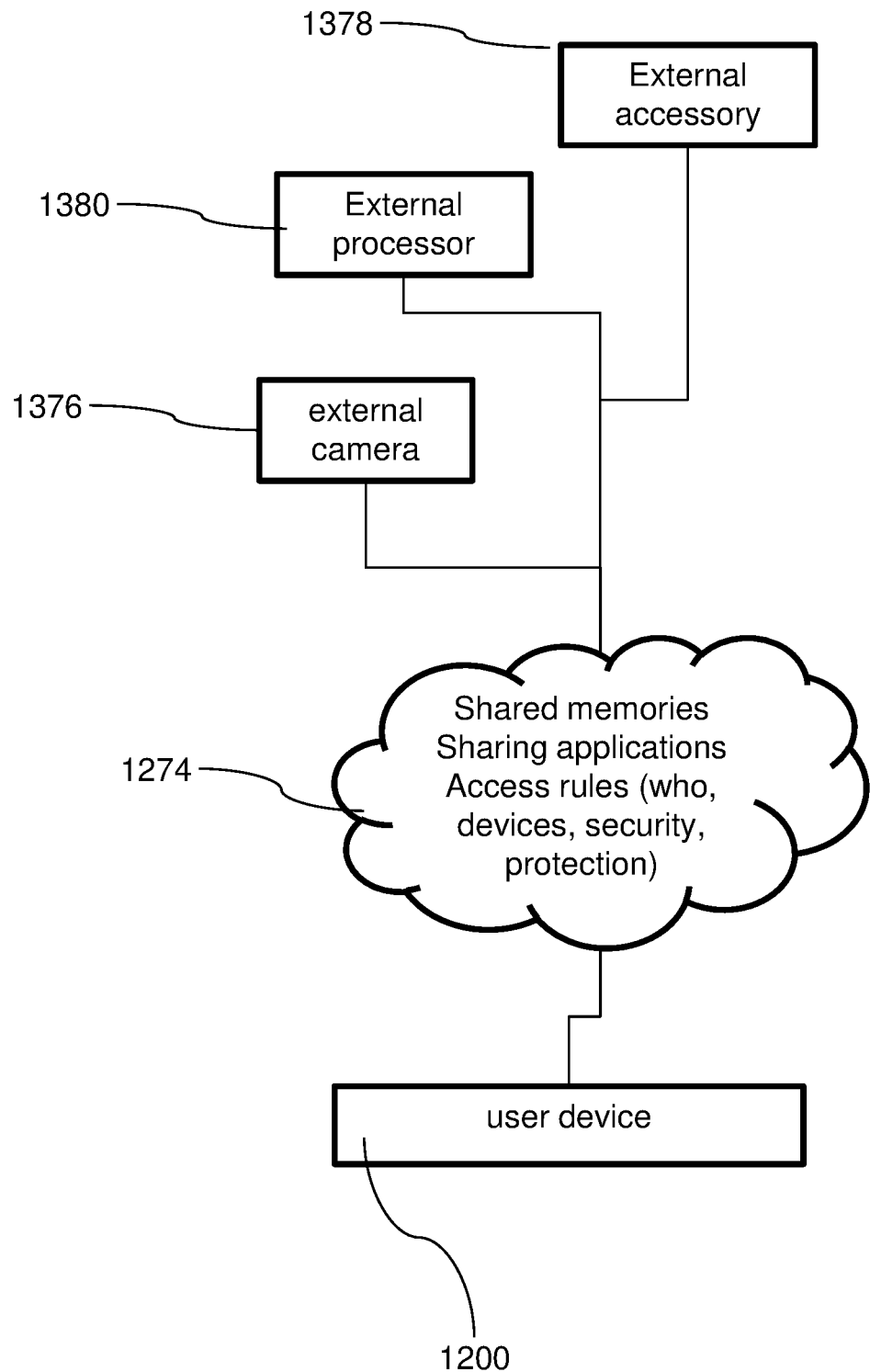
FIG. 13 is a block diagram illustration of connections between an image capturing device and various optional accessories in accordance with an embodiment of the current invention.

FIG. 13 is a block diagram illustration of connections between an image capturing device and various optional accessories in accordance with an embodiment of the current invention. In some embodiments a smart device 1200 and/or a network device may be connected to less capable device. For example, a personal computing device and/or a personal communication device may be connected to a camera 1376. For example, a CherCam™ on device 1200 may control the external camera 1376 over a network 1274 and/or through wireless and/or wired connection. Optionally there may be multiple CherCams™ on device 1200 each controlling camera 1376 to capture an image (for example a still picture and/or video images) in a different way (e.g. changing camera settings and/or direction etc.). In some embodiments, a CherCam™ on the smart device may include instructions controlling an external accessory 1378 such as a smart home and/or a large screen viewing device. For example, a photographer may control sharing of photographs made by a relatively dumb professional camera using CherCams™ on his or her cell phone and/or the photographer may simultaneously control a camera, photo sharing, lighting, view screens and/or curtains in a wedding hall using CherCams™ on his or her computing device and/or smartphone. For example, the CherCam™ may adjust settings of multiple devices and/or active the devices in a synchronized manner. A CherCam™ may be used to channel images and/or sound to other output devices, for example loud speakers and/or printers (for example, a photographer may quickly switch from storing photos of dancing at a wedding to sending portraits of guests to a button printing machine (printing out mementos that are distributed to the guests and/or sharing with the wedding album and/or guests)).

In some embodiments, post processing will be controlled with and/or according to a CherCam™. For example, an external processor 1380 may choose photographs that where made with a "family album" CherCam™ and a "family vacation" CherCam™ for a family yearbook, whereas the processor may ignore photos that were made with a work documents CherCam™. Post processing may be automatic, semi-automatic and/or manual. Grouping may be by rule and/or heuristics and/or machine-learning. Optionally pictures and/or non-image equipment may be linked through a CherCam™ for example to create a virtual reality.

In some embodiments, CherCams™ will be used for video objects. For example, for videos, a CherCam™ may be particularly useful in giving a user quick control over storage and sharing of these large objects that quickly can become a problem when not properly controlled and channeled. For example, the CherCam™ may set rules. For example rules may include how and/or when a video is shared, stored, compressed and/or when it is deleted.

In some embodiment, some CherCams™ may be protected. For example, a CherCam™ may be associated with a password. For example, a password may be required to change attributes of the CherCam™ and/or to access the CherCam™ and/or associated storage.

Camera Skins enable the user to define the look & feel of the CherCam™ Camera-Icon. A camera Skin may be assigned as the default camera skin for a specific CherCam™. A camera Skin may be assigned as the default camera skin for a specific Camera Type. Camera Skins may be shared between CherCam™ users Camera Skins may be given look & feel motifs, with relation to the specific use cases, for example, as detailed above. (e.g. night, sunset, sea view, rain, etc.) various attributes of a camera (shooting attributes, sharing attributes) may be discernable symbolically and/or textually from an icon and/or its title.

In some embodiments, CherCam™ use cases vary and cross different aspects of everyday life, ranging between for example: Organizing personal photos according to needs for personal use, storing and/or organizing office documents, collecting photos of slides of college studies, collecting photos of slides for a specific course of college studies, storing images of paintings, to aid career development (for example of an artist), and/or to document career development (for example of an artist).

Figure 14:
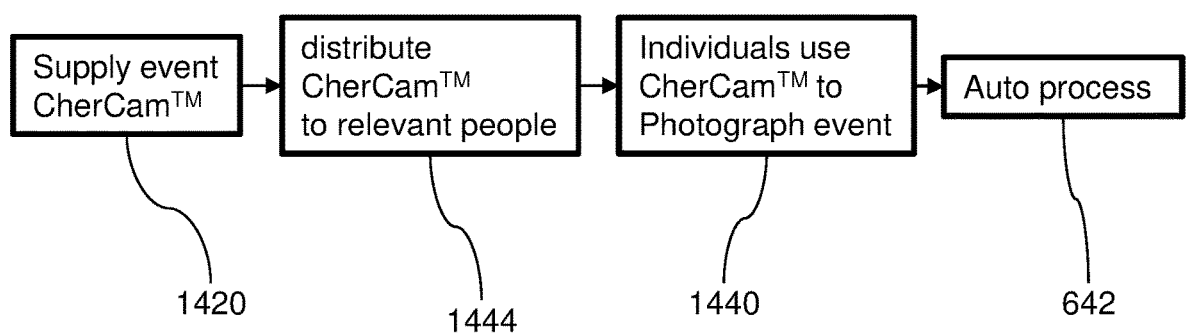
FIG. 14 is a flow chart illustration of a method of sharing images on an event in accordance with an embodiment of the current invention.

FIG. 14 is a flow chart illustration of a method of sharing images on an event in accordance with an embodiment of the current invention. In some embodiments, a CherCam™ may be used to organize a group album for an event. For example, one or more CherCams™ may be supplied 1420 that are configured to capture one or more aspects of the event. Optionally, one or more CherCams™ may be distributed 1444 to relevant people, for example, attendees, people who are interested in the event but did not attend (for example a family member who couldn't attend a reunion, an event chronicler), organizers etc. Optionally, distribution may be over a social network (for example, relevant people may be collected into a group) and/or via a link (for example a sign may be placed in a strategic point in the event which directs network devices with a link (e.g. a QR code and/or a web address)) and/or via a local wireless device (e.g. over a WIFI and/or using Android Nearby or NearBee App). Optionally, users then use an appropriate CherCam™ to capture 1440 images of the event. Images are optionally processed 642. For example, processing may include saving the images to a shared directory available to the relevant people. For example, processing may include adding features to the photos (for example a characteristic decoration [e.g. a frame] and/or a logo of an event organizer).

In some embodiments, CherCams™ may be distributed 1444 amongst family members for a family trip. Photos captured 1440 by various family members using the shared protocol are optionally stored automatically in a shared directory. Alternatively or additionally, a separate CherCam™ saving to a separate directory (or on the same directory with easily distinguished names) may be distributed 1444 and/or used 1440 for each specific day of the family trip, for example, to keep pictures even more precisely organized. In some embodiments, a CherCam™ may be distributed 1444 to wedding guest, gathering together pictures captured 1440 at the wedding event. For example, the wedding invitation may include a link with access to a shared CherCam™ including a protocol saving pictures to a shared album etc. Optionally, a CherCam™ distributed to members of a tour may be modified by a tour organizer, for example, to arrange the camera settings and/or store in different folders during different parts of a trip. For example, an interface may allow an administrator (e.g. the tour guide) to modify the CherCams™ of all of the group at once.

In some embodiments of the current invention, a CherCam™ may be used for organizing group albums by specific topics. For example, a CherCam™ for birdwatching photos captured by members of our birdwatching group (and/or different CherCams™ for different kinds of birds and/or settings) and/or a CherCam™ specific for each one of a family's children tracking their growth and/or a public CherCam™ to sunset lovers around the globe. Optionally, a CherCam™ may be used for grouping together public photos by businesses which run public attractions and venues. For example, a CherCam™ may be used for attendees at a concert and/or for guests at a tourist attraction for example attending Disneyland during a special festival.

In some embodiments of the current invention an incentive will be offered to encourage users to share images or other data. For example, there may be a contest wherein the person whose image wins (e.g. randomly and/or based on merit (for example a contest for the best images) may receive a prize). Optionally, a user may receive incentives in terms of status on a network and/or in a game. Alternatively or additionally, there may be physical prizes such as credit for buy merchandise and/or fixed salaries. Alternatively or additionally, they may be a game in which users are encouraged to capture and/or send images.

In some embodiments, a shared album will be used to promote products. For example, offers may be made to sell prints and/or items with pictures. In some embodiments, a shared album and/or a protocol will be used to promote and/or advertise a product. For example, a protocol may automatically add a logo to images and/or an event reminder. For example, a protocol may automatically add a sound which may also contain commercially valuable information (for example to a video and/or an audible reminder). Optionally, offers and/or free gifts may be made with advertising content. For example, for attendees at a political rally, t-shirts or hats may be sent with selected pictures from the album and/or a logo for the political party. For example, for attendees at a concerts, t-shirts or hats may be sent with selected pictures from the album and/or a logo for the band and/or paid advertising. In some cases, an advertising content may be added into an album and/or a storage location, for example in the form of a separate file. In some cases the photos and/or albums and/or videos may be personalized and/or include general objects (e.g. targeted images and/or sounds) along with photos of personal interest. For example, targeted advertising of interest may be selected automatically and/or automatically added to an appropriate image (e.g. a picture and/or a set of video images) and/or a sound track.

Some embodiments of the current invention may benefit users in various ways. For example, users may benefit from an application in accordance with embodiments of the current invention for the purpose of sorting and keeping track of photographs and/or other memories in an orderly manner. In some embodiments, this kind of convenient sorting and ordering is achieved in 1-Click when using CherCams™. Using applications in accordance with the current invention may reduce the hassle and effort to users for performing these functions. For example, the Cher-Cam™ application in some embodiments facilitates a true and easily feasible means for quick and convenient shared albums maintenance.

In some embodiments, a system and/or protocol of the current invention may be used for some and/or all of the following functions:

Facilitating creation of containers for 3rd party instances used for a common purpose (e.g. taking pictures)

Facilitating assigning specific setting parameters, for example, application attributes, behaviors, characteristics, rules and instructions (including AI/ML based rules), to each such instance Facilitating activation of these instances along with or without their assigned specific settings Facilitating creation of home screen icons and shortcuts for quick activation of these instances Facilitating sharing these instances between users with or without their assigned specific settings Facilitating sharing a set of such specific settings grouped together (with or without a specific instance)

Facilitating creating linkage between an instance to a specific use case according to the user's needs Facilitating creating linkage between a group of settings to a specific use case according to the user's needs Facilitating assigning meaningful names and/or look and/or feel to these instances and/or settings, in accordance with the required use cases Facilitating sharing of a look and/or feel for these instances' use cases (with or without a specific instance)

Facilitating creation of such containers while using the instances from the same and/or mixing different 3rd party applications and/or mixing instances by 3rd party applications manufactured by different manufacturers.

In some embodiments, shortcuts to a protocol may appear temporarily in a context specific manner. Alternatively or additionally, shortcuts may appear in response to a user action. Alternatively or additionally, shortcuts may be placed in specific menus (e.g. a sharing menu and/or a photo menu) Implementation of such functionality and behavior may often be achieved by making use of public APIs (Application Program Interface) published by the manufacturers of the above stated 3rd party applications.

In some embodiments of the current invention shared packaged protocols may be used for image capture and sharing. Alternatively or additionally, the system may be used for other kinds of data access, saving and/or sharing. The embodiments described above may capture and/or process other data rather than and/or along with capturing and/or processing simple images and/or sets of images (e.g. video clips). For example, a packaged protocol of the current invention may be used for navigation. For example, an embodiment of the current invention may include a protocol and/or user interface packaged for quick call up of navigation instructions. Different instances of the invention may be used by a user for different needs and/or may be customized by the user and/or designed for look and/or feel by the user, to meet the different needs and/or may be shared between users. For example, a user may define a protocol to take the user directly to his or her working place. The application is for example customized to choose the quickest route to work. The protocol may be associated, for example, with a desktop icon, facilitating one click navigation to work. Additionally or alternatively, an instance may be defined to take the user to his or her weekend home. The application is optionally customized to choose a route with preferred nature and scenery. Alternatively or additionally, an embodiment may include a protocol configured for driving at night. The application is optionally customized to choose the route with the most light sources (and/or a safer route). Each instance of the application may be associated for example with an icon that is presented to the user at a convenient location on a device user interface and/or an appropriate place and/or time. For example, a work navigation icon may be placed on a desktop at 8:00 when the user usually leaves for work. For example, a night navigation icon may be placed on a desktop after sunset. In some embodiments, the device may suggest an icon depending on with whom I drive—depending on the day of week, depending on conversation in car (e.g. if there is an argument the device may choose a faster root and/or one with more distractions). Various characteristics of a trip may be selected for example faster and/or slower and/or less distraction and/or more distraction and/or away from restaurants and/or toward restaurants and/or tell me about site (visually and/or orally) and/or play music/choose which music and/or volume track amt gas etc. and/or turn off functions notifications.

In some embodiments, a user creates one or more calculator instances with customized protocols and/or icons. For example, an instance may include a 'standard' calculator instance for helping the user's child with homework. Optionally the user creates 'scientific' calculator instance for taking care of financial issues. User creates 'programmer' calculator instance for using at work as a programmer. each calculator optionally has different memory and/or size keys and/or colors and/or turn on/off functions notifications.

In some embodiments, a system in accordance with the current invention may save the user the bother of carrying out the clicks required to switch between attributes, as usually practiced. For example, the current invention may be applied to a Word processor application discipline. For example, the manager of the regulatory discipline of some workplace may requires workers to place documents which they produce, abiding to very strictly defined storage location hierarchies, for example, in a local network file system. For example, changes in regulatory laws, may cause the manager to now change the existing required hierarchy structure. When implementing the suggested technology, the regulatory manager may supply the workers with word processor application instances which were defined and named by the regulatory manager, in accordance with the current invention method, each instance automatically stores the documents to abide by the desired required hierarchies. The workers in this case, may not be required to perform or learn any new instructions nor to carry out any process using a special purpose software. The workers will just be required to choose and open a specific such instance of their regularly used Word processing application, create their document and press save, as usual.

It is expected that during the life of a patent maturing from this application many relevant image capturing devices and/or sound capturing devices and/or user interfaces and/or communication protocols and/or social networks and/or local communication protocols will be developed and the scope of the terms are intended to include all such new technologies a priori.

As used herein the term "about" and "approximately" refer to ±5%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. A range described as 1 to 2 and/or 2 to 3 includes each and/or the combined range. For example 1 to 2, 2 to 3 or 1 to 3.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of capturing images comprising:
   supplying on a first network communication device, a plurality of visual representations, each said visual representation associated with a preset set of attributes for image capture and sharing;
   placing said plurality of visual representations on a native interface of the network communication device;
   selecting by a user of one of said visual representations with a first gesture on said native interface to open an image capturing application on said network communication device with a respect set said preset set of attributes associated with said one of said visual representations;
   capturing an image by said user with said image capturing application of said network communication device with said respective set of said attributes;
   automatically processing the image according to said respective set of said attributes of said one of said visual representations;
   sharing by said user of said respective set of said attributes with another user;
   placing on a second native interface of a second network communication device a selectable representation associated with said respective set of said attributes;
   selecting of said selectable representation by said another user on the second network communication device with said first gesture on said second native interface to open an image capturing application on said second network communication device with said respect set said preset set of attributes associated with said one of said visual representations;
   capturing another image by said another user said with said respective set of said attributes; and
   automatically processing another image according to said respective set of said attributes of the selected one visual representation.

2. The method of claim 1, further comprising: modifying by said user on said network communication device of said attributes associated with at least one of said visual representations.

3. The method of claim 1, further comprising sharing captured images with a preset sharing group; and
warning a member of the group before an image is deleted.

4. The method of claim 1, further comprising:
processing an existing image according to said attributes including; associating said existing image with said one visual representation associated with a preset sharing group; and
automatically processing the image according to said respective set of said attributes of said one of said visual representations.

5. The method of claim 4, wherein said processing of said existing image is initiated by a user dragging and dropping an icon associated with said existing image into an icon said visual representation on said native interface.

6. The method of claim 1, further comprising: detecting at least one attribute selected from a content and a context of said image and suggesting to said user said visual representation based on said detecting.

7. The method of claim 1, further comprising: said user creating a new visual representation; and associating a new set of attributes with said new visual representation with said network communication device.

8. The method of claim 1, wherein said image capturing and processing protocol adding promotional content to an image.

9. The method of claim 1, wherein for each said preset set of attributes said automatic processing includes saving said image to a respective memory destination, the method further comprising: switching between a camera view configured for said capturing of said image and an album view of said respective memory destination in response to a second gesture.

10. The method of claim 1, further comprising viewing images made with preset set of attributes on an image album by a second gesture on said native interface.

11. A system for taking photos comprising:
a smartphone;
a processor receiving an image from said smartphone;
a memory controlled by said processor storing a plurality of sets of preset attributes a native user interface of said smartphone for controlling said processor to open one of a plurality of applications on the smartphone;
a plurality of visual representations on said native user interface and wherein each respective set of said plurality of sets of attributes is associated with one of said visual representations, said smartphone configured to open an image capturing application on said smartphone and to apply said respective set of preset attributes to associate with said image captured by said smartphone in response to a user selecting a visual representation of said plurality of visual representations wherein said set of attributes further include instruction defining how to share the image with a group of users and wherein said processor is further configured to send a warning to at least one member of the group before deleting an image in accordance with instructions from another member of the group.

12. The system of claim 11: further comprising: at least two memory destinations, wherein each said set of attributes defines which of said at least two memory destinations to store said image.

13. The system of claim 12 wherein at least one of said at least two memories is a shared memory.

14. The system of claim 12, further comprising a memory destination, wherein each said set of attributes includes instructions to store said image in said memory destination and wherein said processor is further configured to switch between a camera view of said smartphone and an album view of said memory destination in response to a gesture on said user interface.

15. The system of claim 11, further comprising: a data communication interface to a network and a network protocol for sending data over said network to another smartphone and wherein said processor is further configured for sending said set of attributes to said another smartphone over said network.

16. The system of claim 15, wherein said network includes a social network and wherein said processor is configured for sharing said set of attributes over said social network.

17. A method of capturing images comprising: supplying on a first smartphone, a plurality of visual representations, each said visual representation associated with a preset set of attributes for image capture and sharing;
placing said plurality of visual representations on a native interface of the smartphone;
selecting by a user of one of said visual representations with a first gesture on said native interface to open an image capturing application on said smartphone with a respect set said preset set of attributes associated with said one of said visual representations;
capturing an image by said user with said image capturing application of said smartphone with said respective set of said attributes;
automatically processing the image according to said respective set of said attributes of said one of said visual representations.

18. The method of claim 17, further comprising: modifying by said user on said smartphone of said attributes associated with at least one of said visual representations.

19. The method of claim 17, further comprising sharing captured images with a preset sharing group; and
warning a member of the group before an image is deleted.

20. The method of claim 17, further comprising:
processing an existing image according to said attributes including; associating said existing image with said one visual representation associated with a preset sharing group; and
automatically processing the image according to said respective set of said attributes of said one of said visual representations.

21. The method of claim 20, wherein said processing of said existing image is initiated by a user dragging and dropping an icon associated with said existing image into an icon said visual representation on said native interface.

22. The method of claim 17, further comprising: detecting at least one attribute selected from a content and a context of said image and suggesting to said user said visual representation based on said detecting.

23. The method of claim 17, further comprising: said user creating a new visual representation; and associating a new set of attributes with said new visual representation with said network communication smartphone.

24. The method of claim 17, wherein said image capturing and processing protocol adding promotional content to an image.

25. The method of claim 17, wherein for each said preset set of attributes said automatic processing includes saving said image to a respective memory destination, the method further comprising: switching between a camera view configured for said capturing of said image and an album view of said respective memory destination in response to a second gesture.

26. The method of claim 17, further comprising viewing images made with preset set of attributes on an image album by a second gesture on said native interface.

* * * * *